(12) United States Patent
Watanabe

(10) Patent No.: US 10,648,431 B2
(45) Date of Patent: May 12, 2020

(54) AIR INTAKE STRUCTURE OF AUTOMOBILE AIR CLEANER AND AIR INTAKE STRUCTURE FOR AUTOMOBILE

(71) Applicant: HONDA MOTOR CO., LTD., Tokyo (JP)

(72) Inventor: Tamaki Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 121 days.

(21) Appl. No.: 15/826,674

(22) Filed: Nov. 30, 2017

(65) Prior Publication Data

US 2018/0245550 A1     Aug. 30, 2018

(30) Foreign Application Priority Data

Feb. 27, 2017 (JP) .................................. 2017-034524

(51) Int. Cl.
| | |
|---|---|
| *B01D 46/10* | (2006.01) |
| *F02M 35/024* | (2006.01) |
| *B60K 13/02* | (2006.01) |
| *F02M 35/16* | (2006.01) |
| *B01D 46/00* | (2006.01) |

(52) U.S. Cl.
CPC ....... *F02M 35/02416* (2013.01); *B60K 13/02* (2013.01); *F02M 35/161* (2013.01); *B01D 46/0006* (2013.01); *B01D 46/0041* (2013.01); *B01D 46/10* (2013.01); *B01D 2279/60* (2013.01)

(58) Field of Classification Search
CPC ................ B01D 46/10; B01D 46/0006; B01D 46/0041; B01D 2279/60; B60K 13/02; F02M 35/02416; F02M 35/161

USPC ....... 55/385.3, 476, 480; 123/198 E, 184.21; 180/68.3, 219, 225

See application file for complete search history.

(56) References Cited

U.S. PATENT DOCUMENTS

| | | | |
|---|---|---|---|
| 7,981,179 B2 * | 7/2011 | Nobuhira ........... | B01D 46/0005 55/385.3 |
| 7,985,271 B2 * | 7/2011 | Nobuhira ......... | F02M 35/10144 123/198 E |

(Continued)

FOREIGN PATENT DOCUMENTS

| | | |
|---|---|---|
| CN | 203476550 U | 3/2014 |
| CN | 204476615 U | 7/2015 |

(Continued)

OTHER PUBLICATIONS

Japanese Office Action for corresponding JP Application No. 2017-034524, dated Aug. 15, 2018.

(Continued)

*Primary Examiner* — Minh Chau T Pham
(74) *Attorney, Agent, or Firm* — Mori & Ward, LLP

(57) ABSTRACT

An air intake structure for an automobile includes an intake duct provided in an engine compartment that is located below an engine hood of the automobile. The intake duct includes an inlet opening, an outlet opening, and a duct body. Air is configured to be sucked in from the engine compartment through which the inlet opening. The air is configured to be supplied to a casing of an air cleaner provided in the engine compartment. The duct body connects the inlet opening and the outlet opening. The duct body has a contact portion that is configured to be in contact with the casing of the air cleaner.

15 Claims, 6 Drawing Sheets

(56) References Cited

U.S. PATENT DOCUMENTS

| | | | | |
|---|---|---|---|---|
| 8,302,722 | B2* | 11/2012 | Fujiyama | B62J 37/00 |
| | | | | 180/219 |
| 9,677,518 | B2* | 6/2017 | Arima | F02B 39/04 |
| 2008/0282654 | A1* | 11/2008 | Matschl | B01D 46/0015 |
| | | | | 55/385.3 |
| 2011/0232983 | A1* | 9/2011 | Abe | B01D 46/0005 |
| | | | | 180/68.3 |
| 2013/0139483 | A1* | 6/2013 | Jung | F02M 35/02416 |
| | | | | 55/480 |
| 2013/0146378 | A1* | 6/2013 | Shigematsu | B60K 13/02 |
| | | | | 180/68.3 |
| 2013/0192912 | A1* | 8/2013 | Shimomura | F02M 35/02416 |
| | | | | 180/68.3 |
| 2015/0275832 | A1* | 10/2015 | Kontani | B62K 11/04 |
| | | | | 180/219 |
| 2017/0057583 | A1* | 3/2017 | Yokoyama | B62K 5/027 |
| 2017/0089308 | A1* | 3/2017 | Yamashita | B60K 13/02 |
| 2017/0106942 | A1* | 4/2017 | Hasegawa | B62M 7/06 |
| 2017/0167453 | A1* | 6/2017 | Koyama | F02M 35/162 |

FOREIGN PATENT DOCUMENTS

| | | |
|---|---|---|
| JP | 56-022461 U | 2/1981 |
| JP | 04-052555 U | 5/1992 |
| JP | 04-069663 U | 6/1992 |
| JP | 4616867 B2 | 2/2009 |
| JP | 2014-205412 | 10/2014 |

OTHER PUBLICATIONS

Chinese Office Action for corresponding CN Application No. 201810025870.2, dated Jan. 22, 2020 (w/ English machine translation).

* cited by examiner

AIR INTAKE STRUCTURE OF AUTOMOBILE AIR CLEANER AND AIR INTAKE STRUCTURE FOR AUTOMOBILE

CROSS-REFERENCE TO RELATED APPLICATIONS

The present application claims priority under 35 U. S. C. § 119 to Japanese Patent Application No. 2017-034524, filed Feb. 27, 2017. The contents of this application are incorporated herein by reference in its entirety.

BACKGROUND OF THE INVENTION

Field of the Invention

The present invention relates to an air intake structure of an automobile air cleaner and to an air intake structure for an automobile.

Discussion of the Background

There is publicly known in Japanese Patent No. 4616867 below an automobile in which an air duct made of an elastic material is mounted on a lower face of an engine hood and an air guide passage is formed between the lower face of the engine hood and the air duct to guide a fresh air inside an engine compartment into an air inlet port of an air cleaner by way of the air guide passage.

SUMMARY

According to one aspect of the present invention, an air intake structure of an automobile air cleaner for sucking in, by way of an intake duct, a fresh air into a casing of an air cleaner that is placed in an engine compartment located below an engine hood, the structure being characterized in that the intake duct includes: an inlet opening that sucks in a fresh air in the engine compartment; an outlet opening that feeds the sucked fresh air into the casing; and a duct body part that connects the inlet opening and the outlet opening to each other, and the duct body part is placed in contact with a front face of the casing.

According to another aspect of the present invention, an air intake structure for an automobile includes an intake duct provided in an engine compartment that is located below an engine hood of the automobile. The intake duct includes an inlet opening, an outlet opening, and a duct body. Air is configured to be sucked in from the engine compartment through which the inlet opening. The air is configured to be supplied to a casing of an air cleaner provided in the engine compartment. The duct body connects the inlet opening and the outlet opening. The duct body has a contact portion that is configured to be in contact with the casing of the air cleaner.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
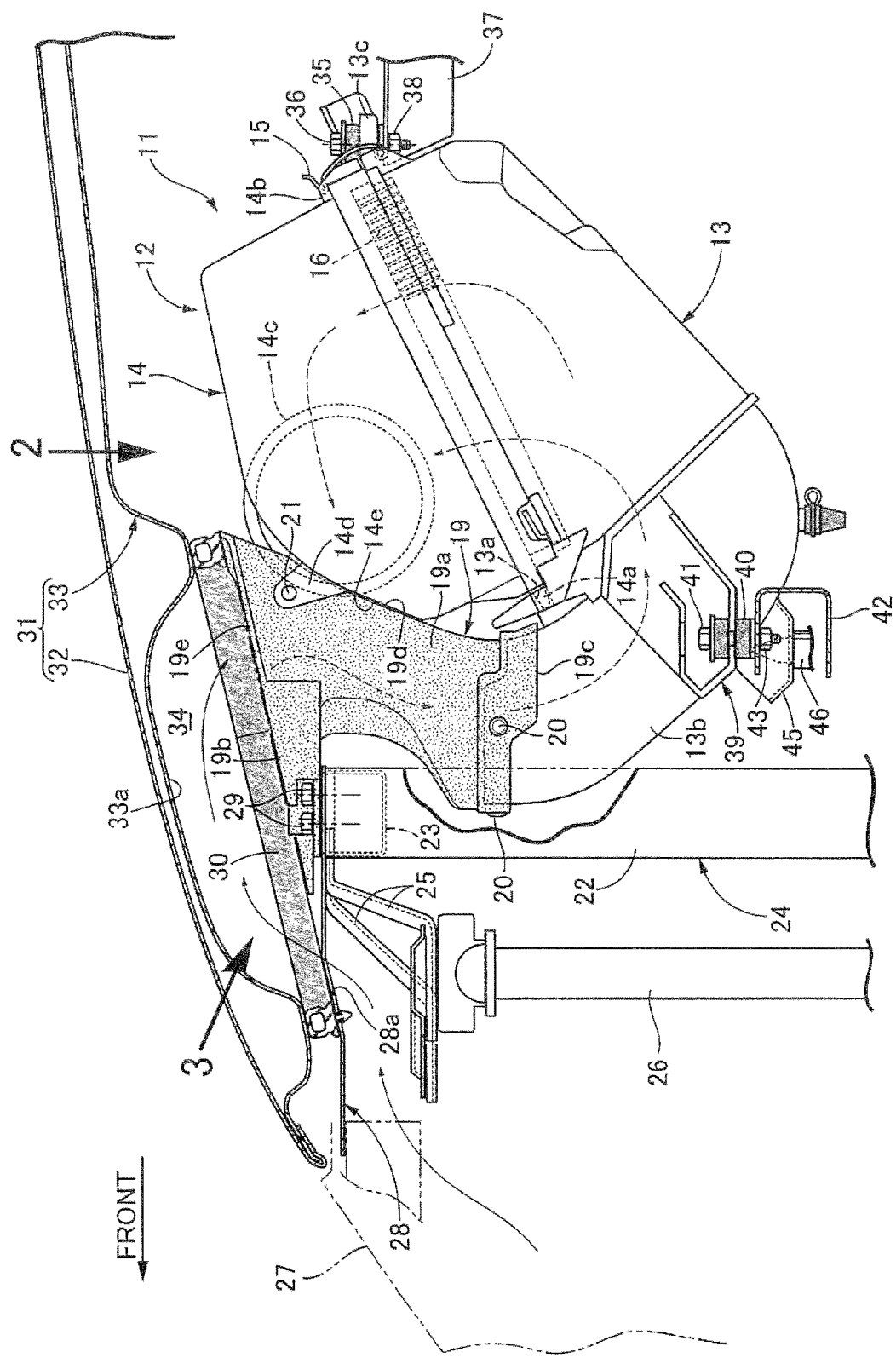
FIG. 1 is a vertical sectional diagram of an engine compartment of an automobile equipped with an air cleaner.

The embodiments will now be described with reference to the accompanying drawings, wherein like reference numerals designate corresponding or identical elements throughout the various drawings.

Hereinbelow, an embodiment of the present invention is described based on FIGS. 1 to 7. Note that, throughout this specification, a longitudinal direction, a lateral direction (vehicle-widthwise direction), and a vertical direction are defined based on an occupant sitting on a driver's seat.

As illustrated in FIGS. 1 to 4, a synthetic resin casing 12 of an automobile air cleaner 11 is formed by joining: a container-shaped casing body 13 that is open upward; and a container-shaped cover 14 that is open downward together. The cover 14 is openably joined to the casing body 13 in such a way that two clips 15, 15 arranged in a rear part of the casing body 13 engage with a flange 14b formed in a rear part of the cover 14 while a pair of left and right engagement protrusions 14a, 14a (see FIGS. 1 and 5) formed in a front part of the cover 14 engage with a pair of left and right engagement recesses 13a, 13a (see FIGS. 1 and 5) formed in a front part of the casing body 13. An element 16 for filtering out dust in the fresh air is supported on an upper opening of the casing body 13. Thus, when the cover 14 is closed, a dirty chamber 17 (see FIG. 5) is defined between an inner face of the casing body 13 and the element 16, whereas a clean chamber 18 (see FIG. 5) is defined between an inner face of the cover 14 and the element 16.

A tubular inlet duct part 13b extending in the vertical direction is integrally formed in a front face of the casing body 13. The lower end of the inlet duct part 13b communicates with the dirty chamber 17, while the upper end of the inlet duct part 13b is coupled to an intake duct 19. Meanwhile, a tubular outlet duct part 14c extending in the vehicle-widthwise direction is integrally formed in a right side face of the cover 14. The left end of the outlet duct part 14c communicates with the clean chamber 18, while the right end of the outlet duct part 14c is connected to a turbocharger via a duct member (not illustrated).

The intake duct 19 is made of elastic rubber, and includes: a tubular duct body part 19a that extends in the vertical direction; a plate-shaped inlet opening 19b that juts forward from the upper end of the duct body part 19a and is open upward; and an outlet opening 19c that is formed at the lower end of the duct body part 19a and fastened to the inlet duct part 13b of the casing body 13 with multiple rivets 20 . . . . The duct body part 19a is provided on both left and right faces with a pair of left and right hinge pins 21, 21 that pivotally support a pair of left and right hinge brackets 14d, 14d protruding from an upper face of the cover 14, which makes a rear part of the cover 14 swingable upward about the hinge pins 21, 21. In addition, when the cover 14 is closed, a rear wall 19d of the duct body part 19a of the intake duct 19 is in contact with a front wall 14e of the cover 14 without any clearance in between (see FIG. 1).

A front bulkhead 24 is placed ahead of the air cleaner 11. The front bulkhead includes: a pair of left and right side members 22, 22; and an upper member 23 that connects the upper ends of the left and right side members 22, 22 in the vehicle-widthwise direction, and stays 25 . . . that protrude forward from the upper member 23 of the front bulkhead 24 support the upper end of a radiator 26. The upper end of a front grille 27 placed ahead of the radiator 26 and the upper member 23 of the front bulkhead 24 are connected to each other with a flat grille cover 28 extending substantially horizontally, and a U-shaped notch 28a that is open rearward is formed in a rear edge of the grille cover 28.

On the other hand, a U-shaped flange 19e that is open forward is formed in the inlet opening 19b of the intake duct 19. While the U-shaped notch 28a of the grille cover 28 and the U-shaped flange 19e of the inlet opening 19b of the intake duct 19 are opposite each other, the inlet opening 19b of the intake duct 19 is fastened at its front end to the upper member 23 of the front bulkhead 24 with two bolts 29, 29.

An elastic string-shaped seal member 30 is mounted so as to be laid over the notch 28a of the grille cover 28 and the flange 19e of the intake duct 19. Here, the seal member 30 is cut off at a part corresponding to the left side of the notch 28a of the grille cover 28. Besides, a partition wall 19f protruding upward and extending in the vehicle-widthwise direction is formed on an upper face of the input opening 19b of the intake duct 19 at a position corresponding to the rear end of the cut-off part of the seal member 30.

An engine hood 31 covering the engine compartment is formed by joining: a skin 32 that is located on the outer side of the vehicle body; and a frame 33 that is located on the inner side of the vehicle body, and the seal member 30 is in contact with a lower face of the frame 33 of the engine hood 31. Here, a part of the frame 33 surrounded by the seal member 30 forms a guide wall 33a recessed upward, and this guide wall 33a constitutes a guide passage 34 (see FIG. 1) that guides the fresh air into the input opening 19b of the intake duct 19.

Figure 2:
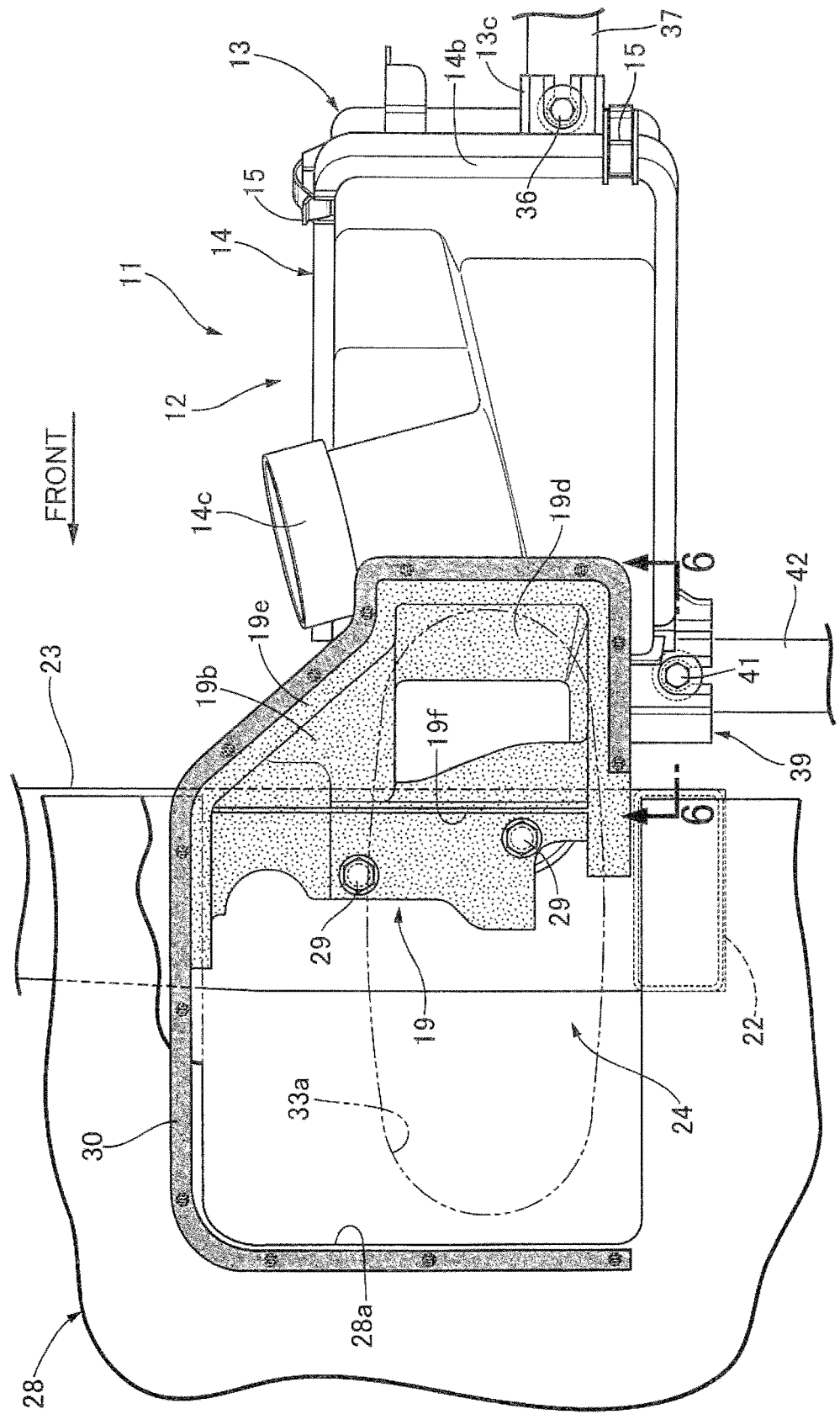
FIG. 2 is a diagram seen in the direction of arrow 2 in FIG. 1.
Figure 3:
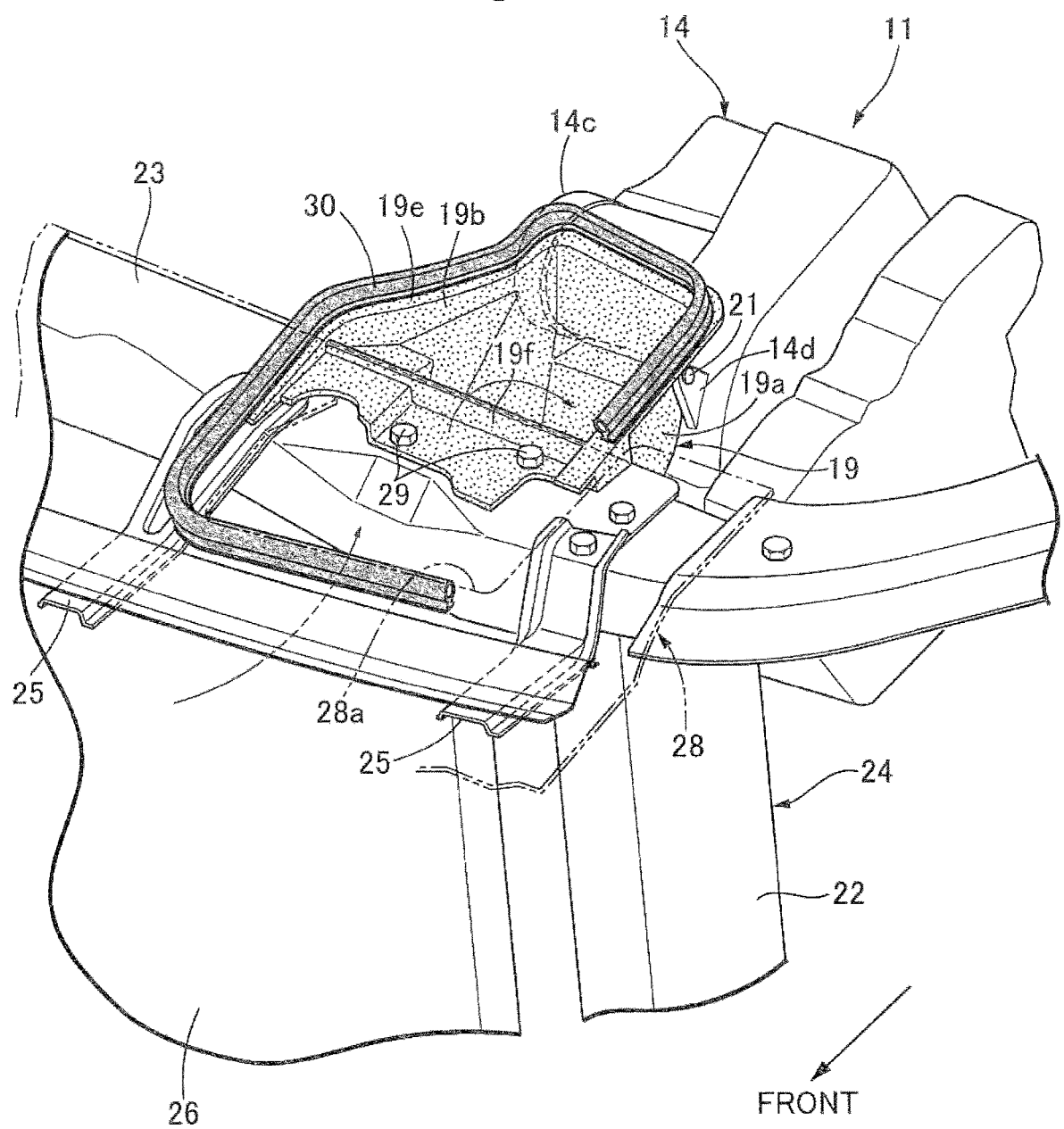
FIG. 3 is a diagram seen in the direction of arrow 3 in FIG. 1.
Figure 4:
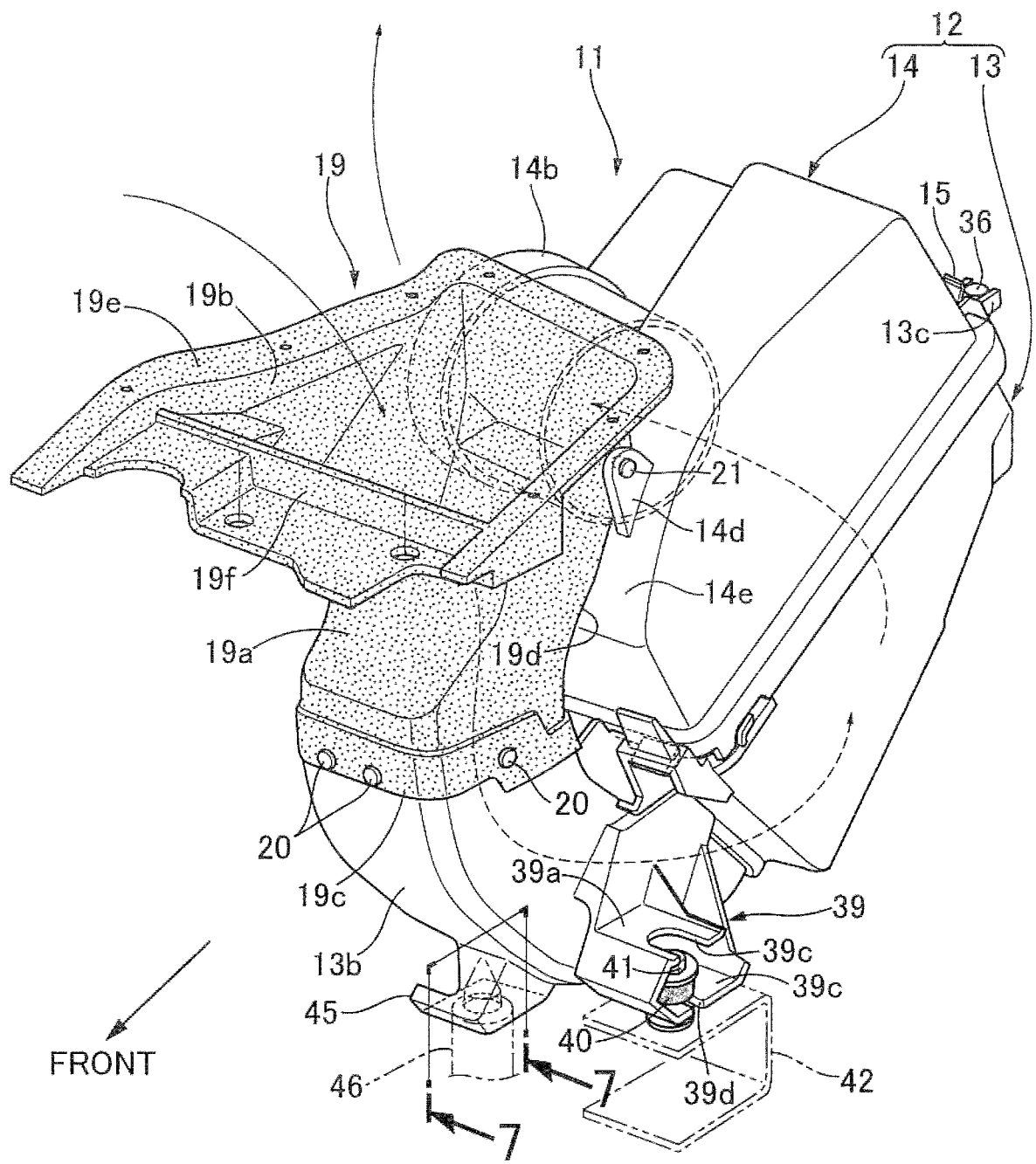
FIG. 4 is a perspective view of the air cleaner.

As illustrated in FIGS. 1 and 2, a rubber bush 35 is mounted on a bracket 13c that is integrally formed in the casing body 13 of the air cleaner 11 so as to protrude from a rear face of the casing body. The casing body 13 of the air cleaner 11 is secured at its rear part to the engine compartment in such a way that a bolt 36 penetrating the rubber bush 35 from above is screwed into a weld nut 38 that is provided to a frame member 37 in the engine compartment.

Figure 6:
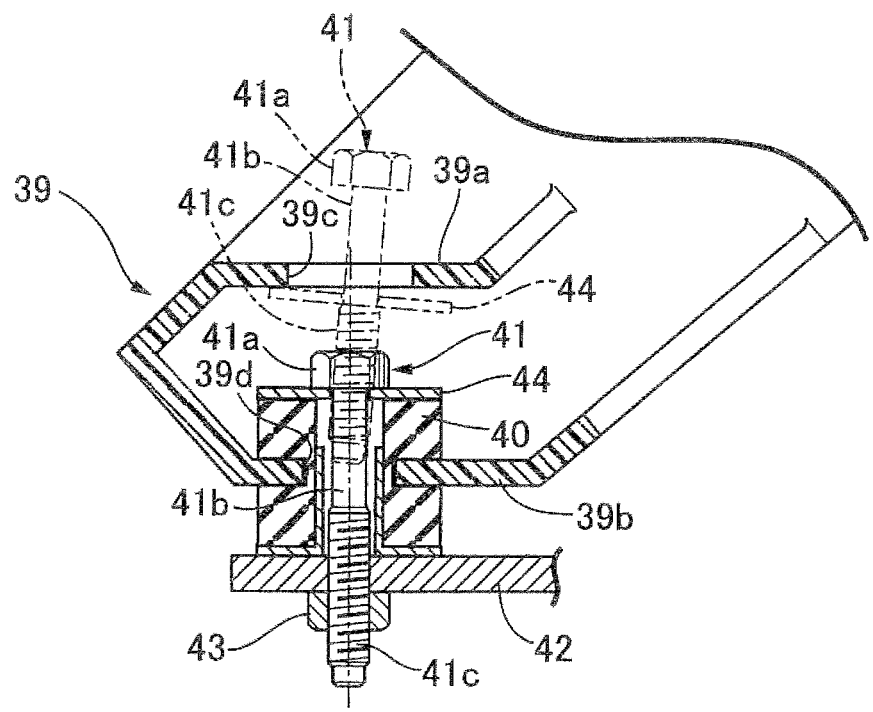
FIG. 6 is a sectional diagram taken along the line 6-6 in FIG. 2.

As illustrated in FIGS. 1, 2, and 6, a bracket 39 is integrally formed in a front lower face of the casing body 13 of the air cleaner 11 so as to protrude therefrom. This bracket includes an upper wall part 39a and a lower wall part 39b that are arranged parallel to each other, a U-shaped tool insertion hole 39c is formed in the upper wall part 39a, and a U-shaped notch 39d is formed in the lower wall part 39b. A rubber bush 40 is fitted into the notch 39d of the lower wall part 39b, and a bolt 41 penetrating the rubber bush 40 from above can be screwed into a weld nut 43 that is provided to a frame member 42 in the engine compartment. The bolt 41 includes a head part 41a, a shank part 41b, and an external thread part 41c, and a washer 44 is supported on the shank part 41b that has a smaller diameter than the head part 41a and the external thread part 41c. The washer 44 is able to move freely along the shank part 41b but unable to pass through the head part 41a and the external thread part 41c, and thus it does not slip off the bolt 41. The bolt 41 penetrates the rubber bush 40 from above in such a manner that the washer 44 is sandwiched between an upper face of the rubber bush 40 and a lower face of the upper wall part 39a.

Figure 7:
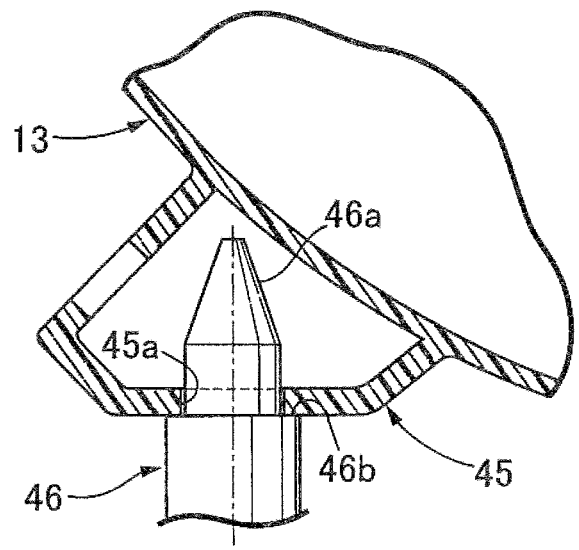
FIG. 7 is a sectional diagram taken along the line 7-7 in FIG. 4.

As illustrated in FIGS. 1 and 7, a protruding part 45 is integrally formed in the front lower face of the casing body 13 of the air cleaner 11 at a position adjacent to the bracket 39, and a locating hole 45a is formed in a lower face of the protruding part 45. In addition, a locating pin 46 that can be fitted into the locating hole 45a located in the lower face of the protruding part 45 stands on a frame member (not illustrated) in the engine compartment. A tip part 46a of the locating pin 46 is pointed, and a lower half part of the locating pin 46 changes to a lager diameter from a step part 46b.

Next, an operation of the embodiment of the present invention having the above configuration is described.

Of a traveling wind having passed through the front grille 27, a low-temperature traveling wind bypassing the radiator 26 upward is guided to the guide wall 33a formed by recessing the frame 33 of the engine hood 31 upward, and is then sucked into the inlet opening 19b of the intake duct 19 that opens facing the guide wall 33a. The fresh air having been sucked into the inlet opening 19b of the intake duct 19 is sucked into the inlet duct part 13b of the casing body 13 of the air cleaner 11 by way of a route from the duct body part 19a to the outlet opening 19c of the intake duct 19, then purified by passing through the dirty chamber 17 in the casing body 13 and the element 16, and then fed to an engine by way of the clean chamber 18 in the cover 14 and the outlet duct part 14c of the cover 14.

At this time, since the guide wall 33a of the frame 33 of the engine hood 31 constitutes a guide wall that guides the fresh air into the inlet opening 19b of the intake duct 19, it is possible to guide the fresh air into the inlet opening 19b of the intake duct 19 smoothly using the existing engine hood 31. In addition, since the low-temperature intake air having bypassed the radiator 26 upward is fed to the intake duct 19, reduction of engine power due to increase in the temperature of the fresh air can be avoided. Further, since the area between the inlet opening 19b of the intake duct 19 and the lower face of the engine hood 31 is sealed with the seal member 30, it is possible to prevent a high-temperature air having passed through the radiator 26 and a high-temperature air around the engine from being sucked into the intake duct 19 more reliably.

Besides, water in a traveling wind adversely affects the engine if it is sucked into the intake duct 19; however, since the seal member 30 is partially notched, and the partition wall 19f that partitions off the duct body part 19a is formed on the inlet opening 19b of the intake duct 19, it is possible to discharge the air into the engine compartment through the notched part of the seal member 30 while blocking out the water in the traveling wind with the partition wall 19f.

Meanwhile, inside the engine compartment, various accessories are arranged besides the engine and a transmission and there is hardly any extra space. For this reason, it is hard to secure enough sectional area for the passage of the intake duct 19, which might make it unable to feed enough amount of fresh air to the air cleaner 11. In contrast, according to this embodiment, since the intake duct 19 is made of elastic rubber and the rear wall 19d of its duct body part 19a is in elastic contact with the front wall 14e of the cover 14 of the air cleaner 11, it is possible to prevent a wasted space from being formed between the air cleaner 11 and the intake duct 19 and maximize the sectional area of the passage of the intake duct 19, whereby the air-intake efficiency can be enhanced.

Figure 5:
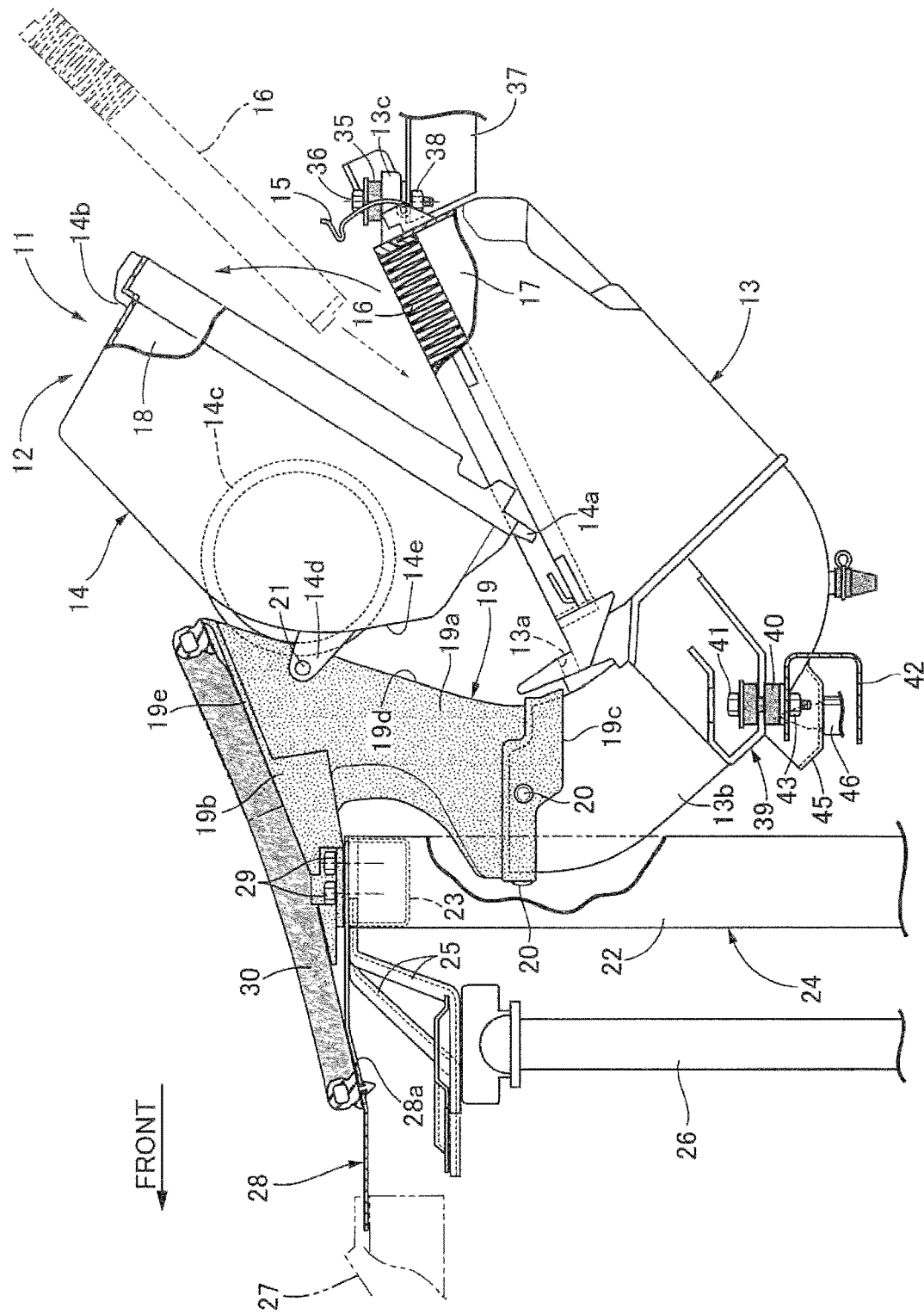
FIG. 5 is a diagram illustrating how the parts in FIG. 1 work.

In addition, the intake duct 19 made of elastic rubber can bring about various operations and effects. Specifically, as illustrated in FIG. 5, at the time of replacement of the element 16 through the gap between the casing body 13 and the cover 14 formed by unlocking the clips 15, 15 and swinging the rear part of the cover 14 of the air cleaner 11 upward about the hinge pins 21, 21, even when the cover 14 is in close contact with the intake duct 19, it is possible to swing the cover 14 easily thanks to elastic deformation of the rubber intake duct 19, which facilitates the work of replacement of the element 16.

Further, the engine hood 31 functions to absorb impact energy by being crushed and deformed downward when a pedestrian lands on an upper face of the engine hood 31; however, if a hard member faces the lower face of the engine hood 31, the engine hood 31 becomes hard to crush and deform downward and energy absorbing performance might be deteriorated. In contrast, according to this embodiment, since the elastically deformable seal member 30 is in contact with the lower face of the engine hood 31 and the elastically deformable intake duct 19 is located below the seal member 30, the engine hood 31 can be crushed easily by elastically deforming the seal member 30 and the intake duct 19, which ensures enough energy absorbing performance.

Furthermore, if the intake duct 19 is made of an elastic material, the vicinity of the inlet opening 19*b* might be crushed and deformed due to intake negative pressure acting on the intake duct 19 and the sectional area of the passage thereof might be reduced; however, because a front part of the inlet opening 19*b* of the intake duct 19 is secured on the upper member 23 of the front bulkhead 24 with the two bolts 29, 29 and a rear part of the inlet opening 19*b* of the intake duct 19 is secured on the hinge brackets 14*d*, 14*d* of the cover 14 of the air cleaner 11 with the two hinge pins 21, 21, it is possible to prevent the intake duct 19 from being crushed due to intake negative pressure and thereby secure enough sectional area of the passage.

The work of attaching the air cleaner 11 to the vehicle body is carried out in the following procedure.

The previously assembled air cleaner 11 is inserted from above toward a predetermined position in the engine compartment and, as illustrated in FIG. 7, the locating hole 45*a* of the protruding part 45 of the casing body 13 is fitted to the locating pin 46 provided on the vehicle body side. At this time, even if the locating pin 46 is invisible from above, the locating hole 45*a* of the protruding part 45 can be fitted to the pin easily thanks to the pointed tip part 46*a* of the locating pin 46. Once the locating hole 45*a* is fitted to the locating pin 46 in this manner, the lower face of the protruding part 45 is brought into contact with the step part 46*b* of the locating pin 46, which enables the weight of the air cleaner 11 to be supported by the vehicle body via the locating pin 46. Thereby, an operator no longer has to support the weight of the air cleaner 11 with his/her hands, thus improving workability.

Next, the bolt 41 axially and radially movably supported in a floating manner by the bracket 39 already is aligned at it tip with the tapped hole of the weld nut 43 by finely adjusting the position of the air cleaner 11 in the longitudinal direction and the lateral direction, and then the bolt 41 is turned and fastened to the nut with a tool to fix the front part of the air cleaner 11 on the vehicle body. At this time, during the work of aligning the tip of the bolt 41 with the tapped hole of the weld nut 43, if the bolt 41 has no washer 44, the bolt 41 brought into contact with the frame 42 might be pushed up and come off from the bracket 39; in contrast, according to this embodiment, when the bolt 41 is pushed up, the washer 44 comes into contact with the upper wall part 39*a* of the bracket 39 and thereby blocks further movement of the bolt 41, thus preventing the bolt from coming off from the bracket 39.

A rear part of the air cleaner 11 is fastened to another frame member 37 with the bolt 36. This fastening work is easy because the bolt 36 is located at a high position in the engine compartment and no obstacle exists.

As has been described thus far, even in the case of performing the work of fastening the bolt 41 at a position hard to visually check or a position out of the operator's reach in the narrow engine compartment, the work of installing the air cleaner 11 can be carried out smoothly by positioning the air cleaner 11 using the locating pin 46 and the locating hole 45*a* and then screwing and fastening the bolt 41, which is undetachably supported on the air cleaner 11 in a floating manner, to the weld nut 43. Moreover, the locating pin 46 keeps regulating the posture of the air cleaner 11 after the installation work is over, whereby the air cleaner 11 can be fixed on the vehicle body more robustly.

The embodiment of the present invention has been described above; however, various design changes can be made on the present invention without departing from the gist thereof.

For example, although the rear wall 19*d* of the duct body part 19*a* of the intake duct 19 is in contact with the front wall 14*e* of the cover 14 of the casing 12 of the air cleaner 11 in this embodiment, it is also possible to bring any position of the duct body part 19*a* of the intake duct 19 in contact with any position of the casing 12 of the air cleaner 11.

Proposed is an air intake structure of an automobile air cleaner for sucking in, by way of an intake duct, a fresh air into a casing of an air cleaner that is placed in an engine compartment located below an engine hood, the structure being characterized in that the intake duct includes: an inlet opening that sucks in a fresh air in the engine compartment; an outlet opening that feeds the sucked fresh air into the casing; and a duct body part that connects the inlet opening and the outlet opening to each other, and the duct body part is placed in contact with a front face of the casing.

Further, proposed is the air intake structure of an automobile air cleaner characterized in that, in addition to the above configuration, the intake duct is made of an elastic material, and a circumference of the inlet opening is fixed to a front bulkhead and the casing.

Further, proposed is the air intake structure of an automobile air cleaner characterized in that, in addition to the above configuration, the casing houses an element therein and includes: a casing body that is fixed to a vehicle body; and a cover that is openably joined to an upper opening of the casing body, and the intake duct is in contact with a front face of the cover.

Further, proposed is the air intake structure of an automobile air cleaner characterized in that, in addition to the above configuration, the inlet opening of the intake duct is in contact with a lower face of the engine hood via a seal member.

Further, proposed is the air intake structure of an automobile air cleaner characterized in that, in addition to the above configuration, the engine hood includes a guide wall that guides a fresh air into the inlet opening of the intake duct.

Further, proposed is the air intake structure of an automobile air cleaner characterized in that, in addition to the above configuration, the air cleaner is fastened, with a bolt, to a screw part from above that is provided to a vehicle body, and the bolt is axially movably and radially movably supported in a floating manner by the casing without being fastened thereto.

Further, proposed is the air intake structure of an automobile air cleaner characterized in that, in addition to the above configuration, the casing includes a locating hole that is provided near the bolt, and the locating hole is able to be fitted from above to a locating pin that is provided to the vehicle body.

Note that a weld nut 43 in an embodiment corresponds to the screw part.

According to the configuration, a fresh air is sucked, by way of the intake duct, into the casing of the air cleaner that is placed in the engine compartment located below the engine hood. The intake duct includes: the inlet opening that sucks in a fresh air in the engine compartment; the outlet opening that feeds the sucked fresh air into the casing; and the duct body part that connects the inlet opening and the outlet opening to each other, and the duct body part is placed in contact with the front face of the casing. Thus, when the air cleaner and the intake duct are arranged in the narrow space of the engine compartment, it is possible to prevent a wasted space from being formed between the casing of the air cleaner and the intake duct and maximize the sectional area of the passage of the intake duct, whereby the air-intake efficiency can be enhanced.

Further, the intake duct is made of an elastic material, and the circumference of the inlet opening is fixed to the front bulkhead and the casing. Thus, when a pedestrian lands on an upper face of the engine hood, it is possible for the engine hood to be deformed downward to absorb impact energy without being interrupted by the intake duct made of an elastic material, and also possible to prevent the inlet opening of the intake duct made of an elastic material from being crushed and deformed due to intake negative pressure acting on the intake duct.

Further, the casing houses the element therein and includes: the casing body that is fixed to the vehicle body; and the cover that is openably joined to the upper opening of the casing body, and the intake duct is in contact with the front face of the cover. Thus, by opening the cover with respect to the casing body while elastically deforming the intake duct made of an elastic material, the work of replacement of the element is facilitated.

Further, the inlet opening of the intake duct is in contact with the lower face of the engine hood via the seal member. Thus, when a pedestrian lands on the upper face of the engine hood, it is possible for the engine hood to be deformed downward to absorb impact energy while deforming not only the intake duct made of an elastic material but also the seal member, and also possible for the seal member to inhibit a high-temperature air in the engine compartment from being sucked through the inlet opening of the intake duct.

Further, the engine hood includes the guide wall that guides a fresh air into the inlet opening of the intake duct. Thus, it is possible to use the engine hood to form the guide wall that communicates with the intake duct, and also to use the guide wall to guide a fresh air into the inlet opening of the intake duct smoothly.

Further, the air cleaner is fastened, with the bolt, to the screw part from above that is provided to the vehicle body, and the bolt is axially movably and radially movably supported in a floating manner by the casing without being fastened thereto. Thus, it is possible to prevent the bolt from coming off from the air cleaner at the time of performing the work of fastening the air cleaner by turning the bolt in the narrow engine compartment, thus improving workability.

Further, the casing includes the locating hole that is provided near the bolt, and the locating hole is able to be fitted from above to the locating pin that is provided to the vehicle body. Thus, by positioning the casing by fitting the locating hole to the locating pin from above, the work of screwing the bolt into the screw part is further facilitated.

Obviously, numerous modifications and variations of the present invention are possible in light of the above teachings. It is therefore to be understood that within the scope of the appended claims, the invention may be practiced otherwise than as specifically described herein.

What is claimed is:

1. An air intake structure of an automobile air cleaner for sucking in, by way of an intake duct, a fresh air into a casing of an air cleaner that is placed in an engine compartment located below an engine hood, wherein
    said intake duct includes:
        an inlet opening that sucks in a fresh air in said engine compartment;
        an outlet opening that feeds the sucked fresh air into said casing; and
        a duct body part that connects said inlet opening and said outlet opening to each other,
    said duct body part is placed in contact with a front face of said casing,
    said inlet opening juts forward from an upper end of said duct body part and is open upward,
    said air cleaner is fastened, with a bolt, to a screw part from above that is provided to a vehicle body, and
    said bolt is axially movably and radially movably supported in a floating manner by said casing without being fastened thereto.

2. The air intake structure according to claim 1, wherein said intake duct is made of an elastic material, and
    a circumference of said inlet opening is fixed to a front bulkhead and said casing.

3. The air intake structure according to claim 2, wherein said casing houses an element therein and includes:
        a casing body that is fixed to the vehicle body; and
        a cover that is openably joined to an upper opening of said casing body, and
    said intake duct is in contact with a front face of said cover.

4. The air intake structure according to claim 1, wherein said inlet opening of said intake duct is in contact with a lower face of said engine hood via a seal member.

5. The air intake structure according to claim 1, wherein said engine hood includes a guide wall that guides a fresh air into said inlet opening of said intake duct.

6. The air intake structure according to claim 1, wherein said casing includes a locating hole that is provided near said bolt, and
    said locating hole is able to be fitted from above to a locating pin that is provided to said vehicle body.

7. The air intake structure according to claim 1, wherein said inlet opening is plate-shaped,
    said duct body part extends in a vertical direction, and
    said outlet opening is formed at a lower end of said duct body part.

8. An air intake structure for an automobile, comprising:
    an intake duct provided in an engine compartment that is located below an engine hood of the automobile, the intake duct comprising:
        an inlet opening through which air is configured to be sucked in from the engine compartment;

an outlet opening through which the air is configured to be supplied to a casing of an air cleaner provided in the engine compartment; and a duct body connecting the inlet opening and the outlet opening, the duct body having a contact portion that is configured to be in contact with the casing of the air cleaner, wherein the air cleaner is fastened, with a bolt, to a screw part from above that is provided to a vehicle body, and the bolt is axially movably and radially movably supported in a floating manner by the casing without being fastened thereto.

9. The air intake structure according to claim 8, further comprising:

the air cleaner provided in the engine compartment of the automobile, the air cleaner comprising:

the casing.

10. The air intake structure according to claim 8, wherein the intake duct is made of an elastic material, and a circumference of the inlet opening is fixed to a front bulkhead and the casing.

11. The air intake structure according to claim 10, wherein the casing houses an element therein and includes:

a casing body that is fixed to the vehicle body; and a cover that is openably joined to an upper opening of the casing body, and the intake duct is in contact with a front face of the cover.

12. The air intake structure according to claim 8, wherein the inlet opening of the intake duct is in contact with a lower face of the engine hood via a seal member.

13. The air intake structure according to claim 8, wherein the engine hood includes a guide wall that guides a fresh air into the inlet opening of the intake duct.

14. The air intake structure according to claim 8, wherein the casing includes a locating hole that is provided near the bolt, and the locating hole is able to be fitted from above to a locating pin that is provided to the vehicle body.

15. The air intake structure according to claim 8, wherein the inlet opening is plate-shaped, the duct body extends in a vertical direction, and the outlet opening is formed at a lower end of the duct body.

* * * * *